(12) United States Patent
Kamireddy et al.

(10) Patent No.: US 9,058,367 B2
(45) Date of Patent: Jun. 16, 2015

(54) METHODS AND SYSTEMS FOR STAGING AND PROPAGATING DATA

(75) Inventors: Nagaraja R. Kamireddy, Mount Prospect, IL (US); Dhinakaran Soundarapandian, Aurora, IL (US); Sai Ramesh J. Rao Konduri, Barlett, IL (US); Prince V. Kochuthresia, Hoffman Estates, IL (US); Divya Gopalakrishnan Nair, Hoffman Estates, IL (US)

(73) Assignee: Sears Brands, L.L.C., Hoffman Estates, IL (US)

( * ) Notice: Subject to any disclaimer, the term of this patent is extended or adjusted under 35 U.S.C. 154(b) by 10 days.

(21) Appl. No.: 13/589,689

(22) Filed: Aug. 20, 2012

(65) Prior Publication Data
US 2014/0052690 A1 Feb. 20, 2014

(51) Int. Cl.
*G06F 17/30* (2006.01)

(52) U.S. Cl.
CPC .................... *G06F 17/30557* (2013.01)

(58) Field of Classification Search
CPC .............. G06F 17/30174; G06F 17/30144
USPC ................................................. 707/610, 625
See application file for complete search history.

(56) References Cited

U.S. PATENT DOCUMENTS

| | | | |
|---|---|---|---|
| 6,330,568 B1 | 12/2001 | Boothby | |
| 6,985,926 B1 * | 1/2006 | Ferlauto et al. | 709/206 |
| 7,024,412 B1 | 4/2006 | Webb | |
| 7,478,099 B1 * | 1/2009 | Gandhi et al. | 1/1 |
| 7,680,831 B1 * | 3/2010 | Gandhi et al. | 707/999.2 |
| 7,689,565 B1 * | 3/2010 | Gandhi et al. | 707/999.01 |
| 7,720,884 B1 * | 5/2010 | Gandhi et al. | 707/804 |
| 7,739,680 B1 * | 6/2010 | Thakur et al. | 717/172 |
| 7,873,607 B1 * | 1/2011 | Knutson et al. | 707/692 |
| 8,060,585 B2 * | 11/2011 | Waud et al. | 709/221 |
| 8,103,704 B2 * | 1/2012 | Abrams | 707/809 |
| 8,108,349 B1 * | 1/2012 | Cherukumudi et al. | 707/641 |
| 8,185,534 B1 * | 5/2012 | Singhal et al. | 707/741 |
| 8,190,562 B2 * | 5/2012 | Sanghvi et al. | 707/610 |
| 8,380,757 B1 * | 2/2013 | Bailey et al. | 707/803 |
| 8,392,363 B2 * | 3/2013 | Rangadass | 707/610 |
| 8,515,987 B1 * | 8/2013 | Jain et al. | 707/769 |
| 2001/0051944 A1 | 12/2001 | Lim | |
| 2002/0178303 A1 | 11/2002 | Beaven | |

(Continued)

OTHER PUBLICATIONS

PCT, Notification of Transmittal of the International Search Report and the Written Opinion of the International Searching Authority, or the Declaration, in International Application No. PCT/US13/53968, dated Mar. 3, 2014. (17 pages).

(Continued)

*Primary Examiner* — Cam-Linh Nguyen
(74) *Attorney, Agent, or Firm* — McAndrews, Held & Malloy, Ltd.

(57) ABSTRACT

A method and system for propagating database records from staging database to a production database so that the production database reflects record changes made in the staging database. The system of the present disclosure propagates record changes from the staging database to the production database in a flexible, customizable, and reliable way. The system consolidates database record changes to cull out any unnecessary record changes that do not need to be propagated. The system may also track the status of the database record changes, and send alerts related to the propagation status.

28 Claims, 4 Drawing Sheets

(56) References Cited

U.S. PATENT DOCUMENTS

| | | | |
|---|---|---|---|
| 2003/0078959 A1* | 4/2003 | Yeung et al. | 709/201 |
| 2003/0212660 A1 | 11/2003 | Kerwin | |
| 2004/0015408 A1* | 1/2004 | Rauen et al. | 705/26 |
| 2005/0102393 A1* | 5/2005 | Murray et al. | 709/224 |
| 2006/0173875 A1* | 8/2006 | Stefaniak | 707/101 |
| 2007/0186068 A1 | 8/2007 | Agrawal | |
| 2008/0098030 A1* | 4/2008 | Edd et al. | 707/102 |
| 2009/0113323 A1* | 4/2009 | Zhao et al. | 715/764 |
| 2009/0132812 A1* | 5/2009 | Kobozev et al. | 713/156 |
| 2010/0192006 A1 | 7/2010 | Gharat | |
| 2012/0109893 A1* | 5/2012 | Bryson | 707/634 |
| 2012/0303584 A1* | 11/2012 | Baffier et al. | 707/640 |
| 2013/0268567 A1* | 10/2013 | Adjei-Banin et al. | 707/812 |

OTHER PUBLICATIONS

IBM "Staging Server." [online] published Oct. 18, 2011 [retrieved Jan. 31, 2013] Retrieved from the Internet <URL: http://pic.dhe.ibm.com/infocenter/wchelp/v6r0m0/topic/com.ibm.commerce.admin.doc/concepts/csstagingserver.htm> entire document (specially p. 1 and p. 2) (5 pages).

* cited by examiner

METHODS AND SYSTEMS FOR STAGING AND PROPAGATING DATA

FIELD OF THE DISCLOSURE

The present description relates generally to data maintenance in a networked environment and more particularly to methods and systems for staging and propagating data.

BACKGROUND OF RELATED ART

As organizations, including retailers, increasingly move their operations to the online space, the organization's website is oftentimes seen as an increasingly important public face of the organization. To maintain a fully functional and comprehensive organizational website (such as a retail website) the organization must be able to rapidly change, update and synchronize their website. For database-driven websites, this requires rapid changes and updates to database records associated with the website. However, unlike most brick-and-mortar stores, online stores are often multi-channel, open 24 hours a day, 365 days of the year, making it difficult to perform maintenance and/or test changes to the system. Organizations may prefer to have a staging database or a staging server to assemble, test, and review changes to the organization website before those changes are applied to a production database and thus to the organization's public website. This is oftentimes especially critical for dynamic organizations which have constantly evolving product and service offerings.

Thus, a need exists for systems and methods for propagating the record changes made in a staging database to a production database. Currently, several out-of-the-box products exist to propagate data and record changes from a staging server to a production server, including IBM's Staging Propagation utility currently available from International Business Markers Corp., Armonk, N.Y. and currently available from Oracle Corporation, Redwood City, Calif. However, for larger staging servers that incorporate a large number of records and record changes, the out-of-the-box solutions may become unreliable, prone to errors, and impracticably slow.

While the background systems and methods identified herein generally work for their intended purpose, the subject invention provides improvements thereto, particularly by providing systems and methods propagating data between a staging database to a production database in a flexible, customizable, and efficient manner.

SUMMARY

In the present disclosure, the system propagates database records from staging database to a production database so that the production database is synchronized to the user-selected and/or user-approved records of the staging database. In accordance with the present disclosure, a user may use a staging database to make non-final record changes, and to conduct quality control and testing. The data propagation process of the present disclosure propagates or implements approved database record changes made in the staging database to the production database so that the production database reflects the approved changes made in the staging database. The disclosed system allows an organization to propagate data in a flexible, customizable, and reliable way.

In one example, the data propagation process of the present disclosure may be used to propagate data for a multichannel retail environment. For example, the staging and production databases may support a retail website which tracks, markets and sells products online, via internet-enabled devices, including personal computers, mobile, and handheld devices. The staging database may contain information related to the retail organization's product and service offerings. Moreover, the data propagation process of the present disclosure allows the retail organization to perform maintenance, testing and quality control for its multichannel retail environment, before that data is propagated to the production database. In this example, the staging database is not publicly accessible, instead it is only available to certain organization personnel, while the production database is publicly available and accessible to the public.

The disclosed system tracks any record changes made in the staging database and may maintain a listing of those record changes in a table of record changes. The disclosed system consolidates record changes so that intermediary record changes that are later rendered unnecessary, duplicative, or moot are not implemented. Thus, the disclosed system propagates data in accordance with consolidated record changes.

The system may be customized by the user, so that the user may determine the speed and robustness of the propagation. In one aspect of the present disclosure, the system may selectively propagate a selected portion of the records maintained in the staging database. For example, if the staging and production databases correspond to databases for a retail website, the system may only propagate records associated with a selected product, department, advertisement(s), store, and/or vendor. The system also allows the user to specify whether the system should propagate data using multiple, concurrent propagation threads, thus increasing the speed of the propagation.

In another aspect of the present disclosure, the system maintains a log of the data propagation status for database records. For example the log may reflect for each record in the staging database, (i) whether the record has been successfully propagated in the production database, (ii) whether the system attempted to propagate that record, but propagation failed; or (iii) whether the record has not yet been propagated. In the customizable system, the user may command the system to suspend the propagation process after a certain number of errors, or propagation exceptions. The customizable system, according to the user's specifications, may also issue alerts regarding the status of the propagation, for example the system may issue an alert each time the propagation of a record fails, each time a record, or a series of records successfully propagates, and/or each time the propagation process is completed. For example, the system may send alerts via telephone message, email message, intranet message, text message, data message, SMS message and/or any other appropriate form of delivering a message to a mobile device, desktop and/or any other suitable device.

BRIEF DESCRIPTION OF THE DRAWINGS

For a better understanding of the present disclosure, reference may be had to various examples shown in the attached drawings.

DETAILED DESCRIPTION

Figure 1:
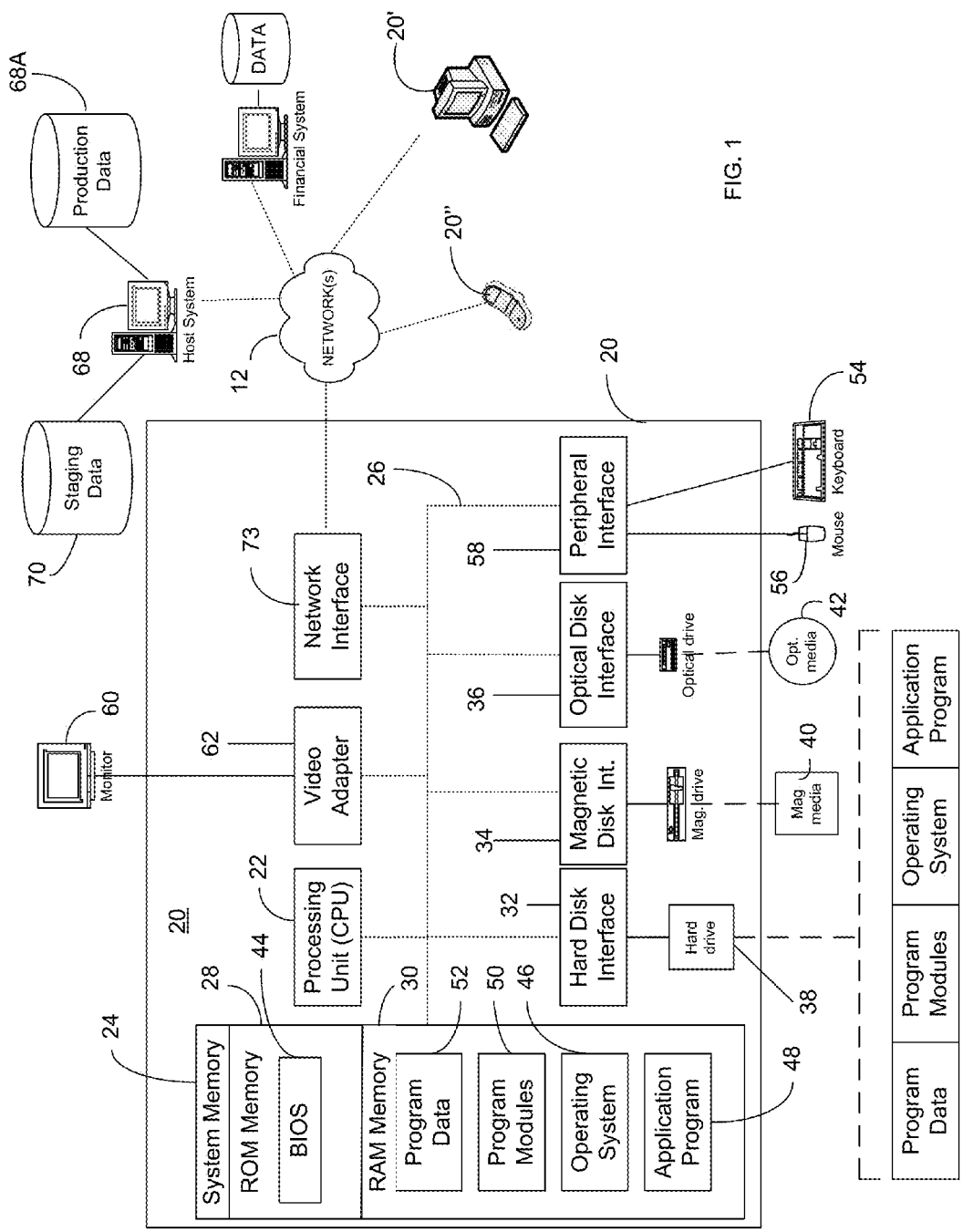
FIG. 1 illustrates in block diagram form components of an example, computer network environment suitable for implementing the example data propagation system disclosed.

The following description of example methods and systems is not intended to limit the scope of the description to the precise form or forms detailed herein. Instead the following description is intended to be illustrative so that others may follow its teachings.

A data propagation system is explained hereinbelow. In general the presently disclosed system propagates database records from staging database to a production database so that the production database is synchronized to the user-selected and/or user-approved records of the staging database. In accordance with the present disclosure, a user may use a staging database to make non-final record changes, and to conduct quality control and testing. The data propagation process of the present disclosure propagates or implements approved database record changes made in the staging database to the production database so that the production database reflects the approved changes made in the staging database. The disclosed system allows an organization to propagate data in a flexible, customizable, and reliable way.

In one example, the data propagation process of the present disclosure may be used to propagate data for a multichannel retail environment. For example, the staging and production databases may support a retail website which tracks, markets and sells products online, via internet-enabled devices, including personal computers, mobile, and handheld devices. The staging database may contain information related to the retail organization's product and service offerings. Moreover, the data propagation process of the present disclosure allows the retail organization to perform maintenance, testing and quality control for its multichannel retail environment, before that data is propagated to the production database. In this example, the staging database is not publicly accessible, instead it is only available to certain organization personnel, while the production database is publicly available and accessible to the public.

The disclosed system tracks any record changes made in the staging database and may maintain a listing of those record changes in a table of record changes. The disclosed system consolidates record changes so that intermediary record changes that are later rendered unnecessary, duplicative, or moot are not implemented. Thus, the disclosed system propagates data in accordance with the consolidated record changes.

The system may be customized by the user, so that the user may determine the speed and robustness of the propagation. In one aspect of the present disclosure, the system may selectively propagate a selected portion of the records maintained in the staging database. For example, if the staging and production databases correspond to databases for a retail website, the system may only propagate records associated with a selected product, department, advertisement(s), store, and/or vendor. The system also allows the user to specify whether the system should propagate data using multiple, concurrent propagation threads, thus increasing the speed of the propagation.

In another aspect of the present disclosure, the system maintains a log of the data propagation status for database records. For example the log may reflect for each record in the staging database, (i) whether the record has been successfully propagated in the production database, (ii) whether the system attempted to propagate that record, but propagation failed; or (iii) whether the record has not yet been propagated. In the customizable system, the user may command the system to suspend the propagation process after a certain number of errors, or propagation exceptions. The customizable system, according to the user's specifications, may also issue alerts regarding the status of the propagation, for example the system may issue an alert each time the propagation of a record fails, each time a record, or a series of records successfully propagates, and/or each time the propagation process is completed. For example, the system may send alerts via telephone message, email message, intranet message, text message, data message, SMS message and/or any other appropriate form of delivering a message to a mobile device, desktop and/or any other suitable device.

With reference to the figures, the following discloses various example systems and methods for providing a system for propagating data between a staging database and a production database. To this end, a processing device 20", illustrated in the exemplary form of a mobile communication device, a processing device 20', illustrated in the exemplary form of a computer system, and a processing device 20 illustrated in schematic form, are provided with executable instructions to, for example, provide a means for a user, e.g., a system employee, network administrator, etc., to access a host system server 68 and, among other things, be connected to a hosted organization website (e.g. an online retail environment, or retail store), a staging database, a production database, an organization's intranet, a supplier database, a website development environment, etc. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, 20', 20" illustrated in FIG. 1 may be embodied in any device having the ability to execute instructions such as, by way of example, a personal computer, a mainframe computer, a personal-digital assistant ("PDA"), a cellular telephone, a mobile device, a tablet, an ereader, or the like. Furthermore, while described and illustrated in the context of a single processing device 20, 20', 20" those of ordinary skill in the art will also appreciate that the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules, and other data for the processing device 20. Those of ordinary skill in the art will further appreciate that other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system server 68 having associated data repository 68A. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, social networking sites, etc.

For performing tasks as needed, the host system server 68 may include many or all of the elements described above relative to the processing device 20. In addition, the host system server 68 would generally include executable instructions for, among other things, propagating data between a staging database and a production database, modifying database records on a staging website, testing and performing quality control on a staging website, updating an organization's service capabilities, tracking the progress of data propagation, sending alerts regarding the progress of data propagation, providing access to an organization's product and service capabilities, etc.

Communications between the processing device 20 and the host system server 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

Figure 2:
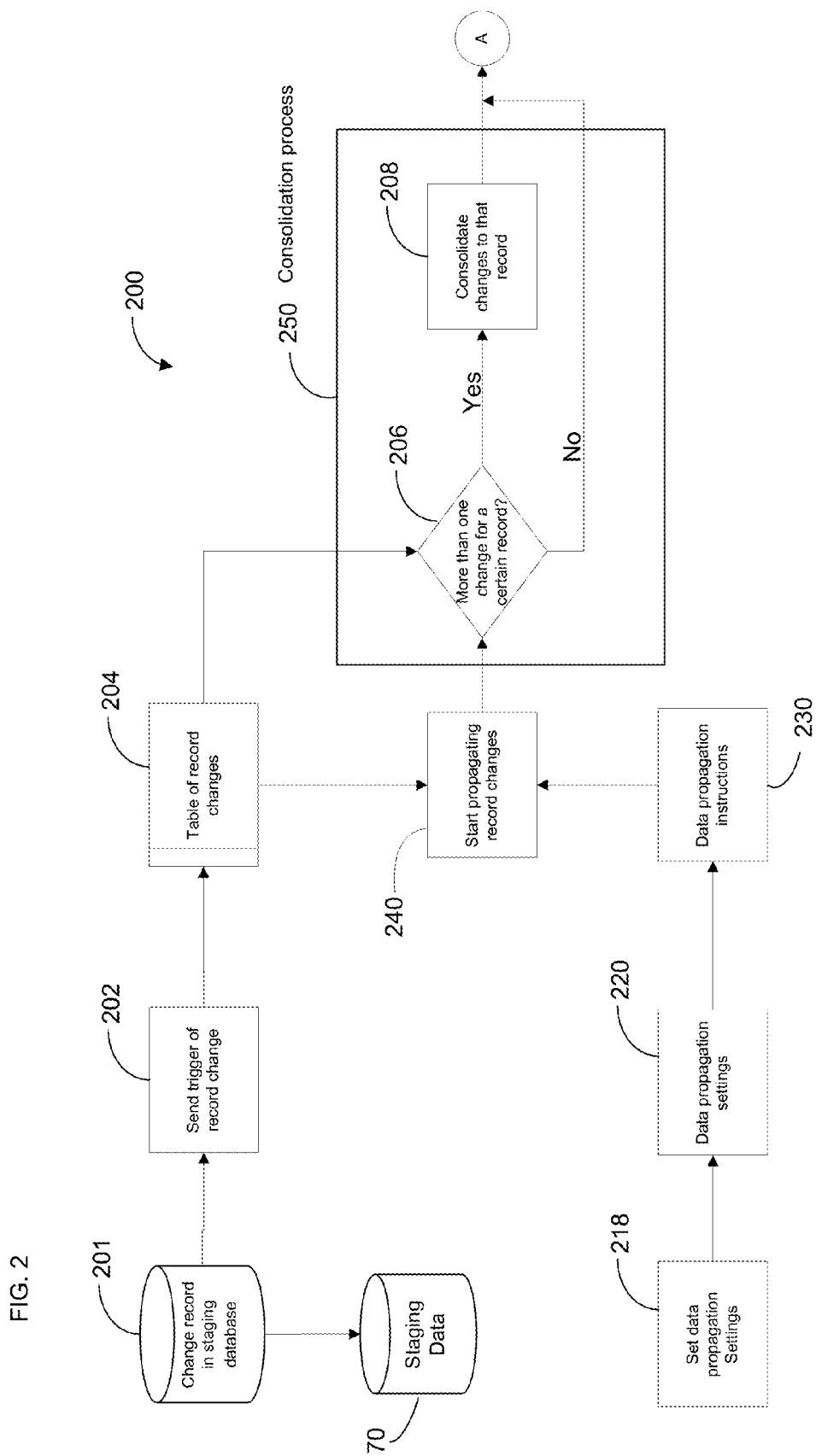
FIG. 2 illustrates a flowchart of an example data propagation process which creates a set of data propagation instructions.

Referring to FIG. 2, there is illustrated an example data propagation process 200 executed by a data propagation system for creating data propagation instructions 230 in accordance with the present disclosure. The example data propagation process 200 is well-suited for operation on a distributed network system, such as, for example, a client-server architecture utilizing the Internet, cloud, mobile network, cellular network, or other suitable wired and/or wireless network. The data propagation process 200 may be implemented in various other communication networks and/or mediums as desired including, for example, a localized, non-distributed network.

Generally speaking, the data propagation process 200 is operable to facilitate propagation of data and record changes between a staging database and a production database. In the illustrated example the staging database and production database are associated with an organization website, such as a multichannel retail environment, and thus the data propagated by the data propagation process 200 relate to information about the organization website, and/or retail website. It will be appreciated by one of ordinary skill in the art, however, that the data propagation system may also be adapted to propagate data between other databases, as desired. Also, the data propagation process 200 may be enacted and operated using any suitable device, such as a computer system, smart phone, a tablet computer, the device 20, or any other suitable known or yet to be developed processing device. Moreover, the data propagation process 200 may be enacted and operated by one or more users, concurrently and/or serially, as desired.

In the illustrated example data propagation process 200, a user changes a record on a staging database 70 at step 201. For example, the change may update, delete or replace a record on the staging database 70. It will be appreciated by one of ordinary skill in the art that the staging database 70 is typically located with the network 12 such that the database as protected, hidden, and/or otherwise secured against public and/or unauthorized access. Thus, the staging database 70 may be considered a development database, non-accessible to the consumer and/or external user. In response to a change in the record in the staging database 70, the data propagation process 200 initiates a trigger or other suitable mechanism to indicate that a certain record on the staging database 70 was changed at step 202. The record change is noted in the table of record changes 204.

When the data propagation system 200 starts propagating the record changes, at block 240, the data propagation process 200 engages in a consolidation process 250 to consolidate the record changes stored in the table of record changes 204. In particular, the example consolidation process 250 determines whether a user has made more than one record change for a certain database record 206 in the staging database 70. If there has been more than one record change for the database record, the data propagation process 200 consolidates changes for that particular record in step 208. Thus consolidation process 250 determines the cumulative change for each record, by removing any intermediary, non-final record changes 201.

In one illustrative example, if a particular record is initially at state A, and then the user changes the record to state B, and then the user changes the record to state C, then the user changes the record to state D, step 208 will consolidate the record changes to reflect the ultimate outcome that the record changed from state A to state D, by removing the intermediary steps. Similarly, if a particular record is initially set to state A, and a user then changes the record to state B, and then back to state A, the consolidation process 250 will consolidate the record changes to reflect that there has not been any effective change to the record.

An example table illustrated below contains example consolidation rules that may be used in step 208 of the consolidation process 250. In particular, the Table (1) below illustrates how a set of record changes will be consolidated based on (i) the first action with respect to the record, and (ii) the last record change made by the user with respect to that record.

TABLE 1

| Staging Database | | Consolidated Consolidated Record |
|---|---|---|
| First Action | Last action | Change |
| I | I | I |
| I | U | I |
| I | D | No change |
| U | I | D, I |
| U | U | U (D, I if D, I is present) |
| U | D | D |
| D | I | D, I |
| D | U | D, I |
| D | D | D |

In the table above I denotes that the record has been inserted; U denotes an update made to the record; and D denotes that the record has been deleted. The consolidation rules set forth above govern the record change data that is propagated according to the user's multiple record changes 200. One of ordinary skill in the art will recognize that the consolidation rules may change depending on the configurations and structure of the database that is staged and produced.

One of ordinary skill in the art will also recognize that the consolidation process may occur at various times during the data propagation process 200. In the one embodiment of the present disclosure the consolidation process 250 may occur continuously, e.g., each time the system receives a trigger indicating a record change 202. In another example, the consolidation process 250 occurs once automatically, immediately before the system begins data propagation. In still another example, the system may enact the consolidation process 250 at a pre-set time, for example, at a certain time during a 24-hour day, or on regular, preset intervals, during a 24-hour day, or at any other pre-set time, as desired. In another example, the data propagation process 200 may enact the consolidation process 250 after a certain condition is met, for example, after a certain number of record changes have been triggered 202 and/or approved, or after the table of record changes 204 becomes a certain size, or after a particular record is changed at step 201.

The consolidation process 250 allows the data propagation process 200 to avoid using unnecessary processing power since it does not enact any unnecessary intermediary record changes made by the user. Instead, the data propagation process 200 enacts the cumulative effect of the user's record changes 200, as determined based on the consolidation process 250. In the disclosed embodiment, the consolidation process 250 is enacted after the data propagation process 200 begins to propagate record changes at block 240. However, one of ordinary skill in the art will recognize that the process 200 may consolidate record changes continuously as record changes 201 are made, and before the process 200 begins propagating record changes 240.

In addition the data propagation process 200 allows a user to establish user-created data propagation settings 220. In particular, one or more users may establish specific data propagation settings 218, and the data propagation process 200 formulates those settings 220 into data propagation instructions 230, which are implemented when the data propagation process begins 240. These data propagation settings 220 may be iteratively changed, that is, one or more users may subsequently change the data propagation settings at a later time. The data propagation process 200 may also include defining security settings to determine which users may set or change the data propagation settings 220.

For example, the user may determine as part of the data propagation settings 220 which records changes to propagate—including which tables, or records to propagate. In other words, the data propagation settings 220 allow the user the ability to "approve" and/or "select" the data records to be propagated from the staging database 70 to the production database 68A. In one illustrative example, the organization may be a retailer, and the user may choose to only propagate certain database records that relate to a certain retail product, department, sales initiative or product category.

The data propagation settings 220 may also contain settings for when the data propagation will occur—for example, the user may set the data propagation process 200 to begin automatically at a certain time(s) during the 24-hour day, or the user may manually trigger the data propagation process 200. In one example, the data propagation settings 220 may set the data propagation process 200 to occur at a fixed time every day so that the organization website reflects new changes at a certain time each day. In another example, the data propagation settings 220 may allow the data propagation process 200 to only propagate certain data records daily, while other data records remain constant. In yet another example of the present disclosure, the data propagation does not occur regularly, but instead the data propagation process 200 only occurs when a user triggers the data propagation process 200, or when a user sets a single future time for the data propagation 200 process to occur.

Figure 3:
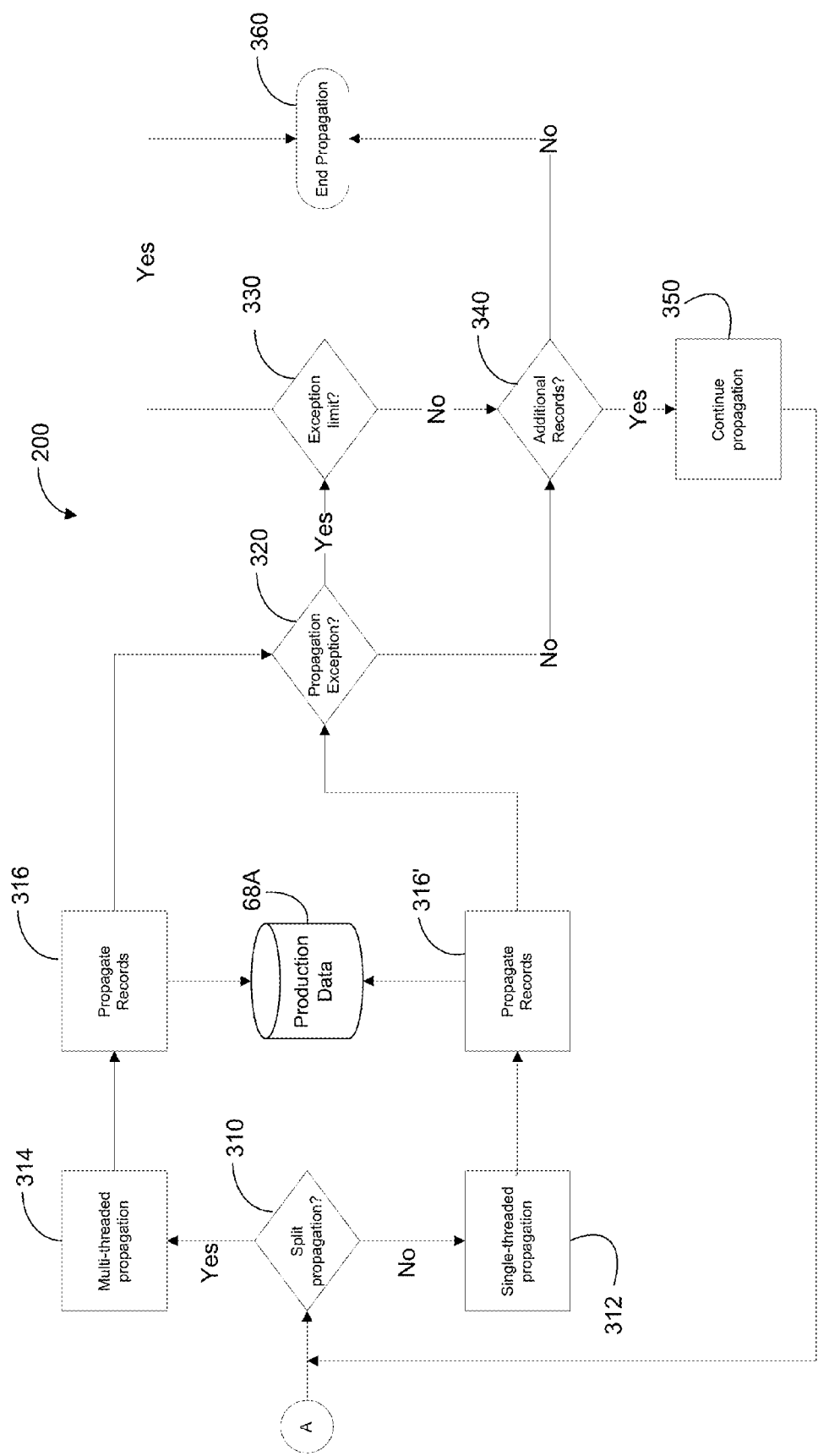
FIG. 3 illustrates a flowchart of the example data propagation process for propagating data from a staging database to a production database based on the data propagation instructions.

In another example, the data propagation settings 220 may determine whether the data propagation process 200 will be single-threaded 316', or multi-threaded 316 as described in FIG. 3. For example the user may choose a multi-threaded data propagation process 200 if there is a large amount of record changes to propagate. A multi-threaded data propagation process 316 will propagate multiple records simultaneously, and thus the multi-threaded data propagation process 316 may be faster than the single-threaded data propagation process 316'. One of ordinary skill in the art will recognize that the data propagation process 200 may also automatically determine whether the propagation process should be split into multiple threads 316, depending on the quantity of data that must be propagated. For example, the user may create settings 218 that instructs the data propagation process 200 to automatically use a multi-threaded propagation process 316 once the table of record changes 204 reaches a certain size. Additionally the user may specify the number of threads that the multi-threaded propagation process 316 should use depending on the size of the table of record changes 204.

The data propagation settings 220 may also set limits for the number of exceptions that the data propagation process 200 may encounter before the data propagation process 200 is suspended. For example an exception may occur if a record change 204, cannot be properly propagated. The data propagation settings 220 may specify that the data propagation process 200 must be suspended after a certain number of exceptions have occurred. Alternately, the data propagation settings 220 may command the data propagation process 200 to complete the data propagation process 200 regardless of the number of exceptions the data propagation process 200 encounters during the data propagation process 200.

The data propagation settings 220 may also contain settings related to the system's alerts—for example the data propagation process 200 may issue alerts to update the user on the status of the data propagation process 200, e.g., when a record or group of records has successfully propagated; when a record or group of records has failed to propagate; when the data propagation process 200 has begun; when the data propagation ends; and/or when the data propagation process 200 has been suspended. The data propagation settings 220 may also specify which users those alerts are sent to, and how those alerts are sent, e.g. via telephone message, email message, intranet message, text message, data message, SMS message to a mobile device, and/or any other appropriate form of delivering a message.

Turning now to FIG. 3, the data propagation process 200 continues with an analysis of the data propagation instructions at block 230. First, the data propagation process 200 determines whether the propagation process should be split into multiple threads 310. As discussed above, the user may decide 218 in the data propagation settings 220 whether the propagation of the consolidated record changes, as determined by the consolidation process 250, should be split into multiple threads. This may depend on the user's preferences, the processing capabilities of the system running the process 200, the size of the table of record changes 204, and/or any other appropriate factors. If the data propagation process 200 splits the propagation 314, the data will propagate records using multiple threads 316. If the data propagation process 200 does not split the propagation, the process 200 will employ a single-threaded propagation process 312 and will propagate the records in a single-thread 316'.

Next, in accordance with the present disclosure, the data propagation process 200 detects whether the process 200 encounters a propagation exception 320 during either the single-threaded propagation process 316', or multi-threaded propagation process 316. If the process 200 does not detect a propagation exception 320, the process 200 inquires if there are additional records to propagate 340. If there are no additional records to propagate, the process 200 ends the data propagation process at block 360. If there are additional records to propagate, the data propagation process 200 continues propagation at block 350. In one illustrative example, the data propagation process 200 may continue propagation at block 350 by determining whether the remaining records should be split 310 into multi-threaded propagation 314 or whether they should be propagated in a single thread 312. One of ordinary skill in the art will also recognize that if the process 200 continues propagation at step 350, the process 200 may skip the step of determining whether the propagation process 200 should be split 310, and instead the process 200 may continue to propagate records either in a single-thread 316' or in a multi-thread 316 depending on the propagation method that it previously used.

If the data propagation process 200 detects a propagation exception at block 320, the process 200 will determine whether the process 200 has reached the exception limit 330. As discussed above, the exception limit 330 may be pre-set by the user as part of the data propagation settings 220, or alternately the use may specify that there is no exception limit 330 as part of the data propagation settings. If the data propagation process 200 detects a propagation exception 320 and determines that the exception limit has not reached 330, the process 200 inquires if there are additional records to be propagated 340 based on the table of record changes 204 and the consolidation process 250. If the data propagation process 200 determines that there has been a propagation exception 320, and the process 200 has reached the maximum number of exceptions based on its exception limit 330, the process 200 ends the data propagation process at block 360.

Figure 4:
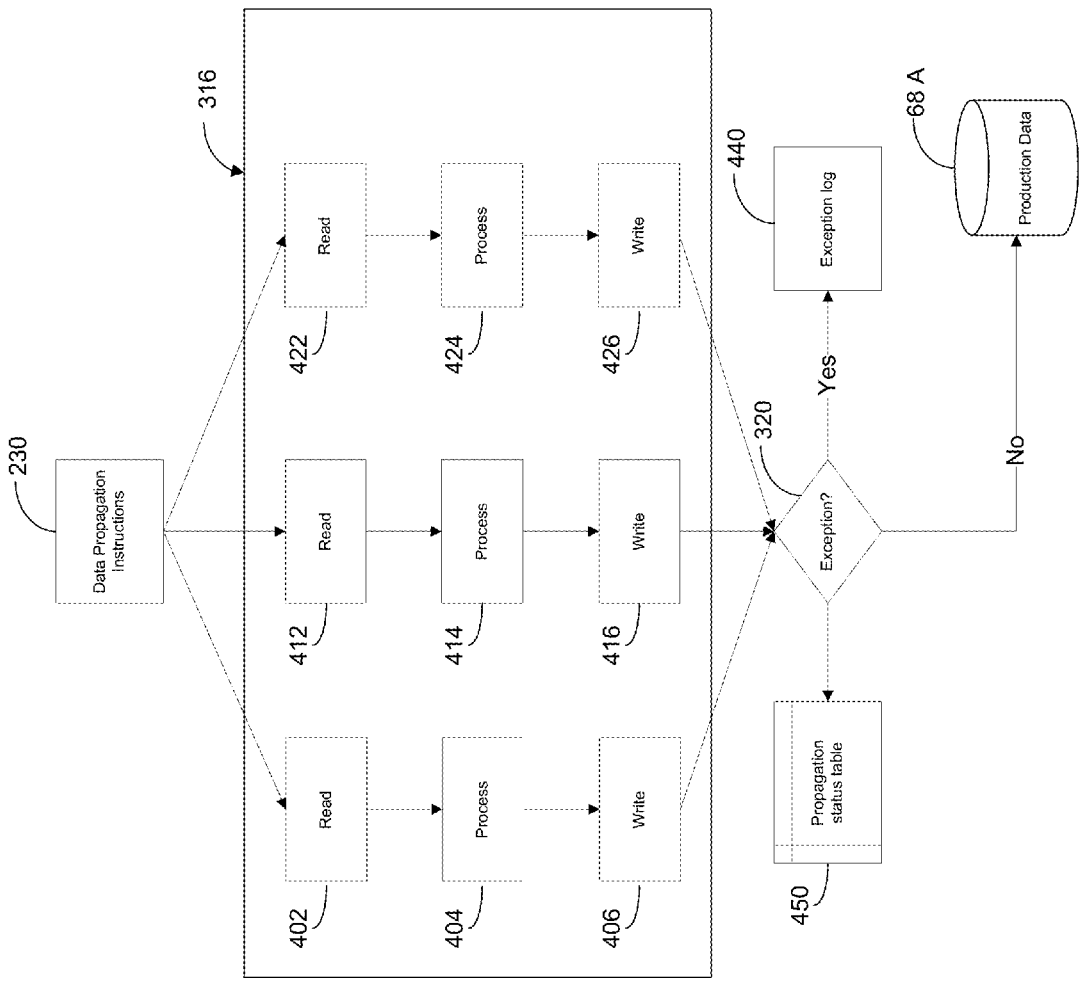
FIG. 4 illustrates a flowchart of the data propagation process comprising a multi-threaded propagation configuration.

In FIG. 4, a multi-threaded data propagation process 316 in accordance with the present disclosure is illustrated. FIG. 4 depicts three data propagation threads: the first thread comprising steps 402, 404, and 406; the second thread comprises steps 412, 414, and 416; and the third thread comprising steps 422, 424, and 416. Each thread of the multi-threaded data propagation process 316 begins with the system reading a specific record 402, 412, 422 from the table of record changes 204. Next, the data propagation process 200 processes the record 404, 414, 424. The processing step 404, 414, 424 may comprise analyzing the record, enacting the consolidation process 250, analyzing the corresponding record in the production database 68A, analyzing the data propagation instructions, and/or any other appropriate processing procedure. Next, the data propagation writes a record change 406, 416, 426 corresponding to the record changes reflected in the table of record changes 204, and the data propagation instructions. The writing step 406, 416, 426 may comprise inserting a new record, updating a record, deleting a record, and any other appropriate combination of writing actions.

FIG. 4 depicts a multi-threaded data propagation process 316 with three data propagation threads. However, one of ordinary skill in the art will recognize that the single-threaded data propagation process 316' may be executed comparably, with a single propagation thread, for example using steps 412, 414, and 416. Similarly, one of ordinary skill in the art will recognize that a multi-threaded propagation process 316 may comprise any number of processing threads as desired and/or as limited by the system executing the data propagation process 200.

Next, the data propagation process 200 determines whether an exception has occurred in step 320. If there is not an exception, the data propagation process 200 updates the production database 68A. In one embodiment of the present disclosure, if the data propagation process 200 detects an exception 320, it may make a note of the exception in an exception log 440. In one example of the present disclosure, the exception log 440 may comprise an entry corresponding to the record for which the exception occurred, a notation of the type of exception that occurred, and/or any diagnostic information, for example the processing time that the system spent on the record before the exception occurred, diagnostic information relating to the propagation exception, etc.

One embodiment of the present disclosure comprises a data propagation status table 450 in addition to the exception log 440 of the data propagation process 200. The data propagation status table contains a listing of the status of the record changes listed in the table of record changes 204 and/or some subset of the table of record changes 204. Indeed, the data propagation status table 450 may be incorporated into the table of record changes 204 as a column or a section of the table. Additionally, the propagation status table 450 may incorporate exception data from the exception log 440, or the propagation status table 450 may not include data relating to data propagation exceptions 320.

Generally, the data propagation status table 450 contains a listing showing the condition of each record change during the data propagation process 200. In one example of the present disclosure, data propagation status table 450 may contain statuses relating to each record change in the table of record changes 204. In another embodiment of the present disclosure, the data propagation status table 450 may contain statuses relating to each record change listed in the table of records 204. In another embodiment of the present disclosure, the data propagation status table 450 contains the status of selected records specified by the user in the data propagation settings 220. For example, the propagation status table 450 may only contain the status of the record changes that the user chose for propagation in the data propagation settings (e.g., approved changes).

The propagation status table 450 may reflect that, for example, (i) the record has been consolidated, and thus will not need to be propagated; (ii) the record is waiting to be propagated; (iii) the record has been successfully propagated; (iv) the record has been placed on hold, and has not propagated; (v) the record has been the subject of an exception and has not propagated; and/or any other appropriate status information.

An example listing of data propagation statuses is shown below in table (2):

TABLE 2

Example Data Propagation Statuses

W (waiting to propagate)
P (propagated)
C (consolidated)
H (on hold)

In this illustrative example, the "W" status means that the selected record is waiting to be propagated in the data propagation process 200. This status may be given to a record change in the table of record changes 204 which the user has selected to propagate, but which has not yet been processed by the data propagation process 200. Here, the "P" status refers to a propagated record, that is, the selected record has successfully propagated to the production database 68A. This "P" status will appear after the propagation of the selected record is complete, however, the "P" status may appear before the entire data propagation process 200 has ended.

In the illustrative table of example propagation status "C" denotes a consolidated record. That is, the record change has been consolidated and incorporated and/or superceded by a later record change. For example, if a user makes an intermediate record change in the staging database 201, which is later over-ridden or rendered moot by a subsequent record change 201, the intermediate record change will be consolidated and the status of the intermediate status change will be changed to "C." Thus, the "C" status is assigned during the consolidation process 250.

In this illustrative example the "H" status means that the record is on-hold. This means that the selected record(s) has been excluded from the data propagation process 200. The user may have chosen to exclude the selected record(s) in the data propagation settings 220.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A computer-readable media having stored thereon computer executable instructions, wherein the instructions perform steps for providing a system for propagating database records from a first database to a second database via a computing device, comprising:
a first database containing a first set of database records;
a second database containing a second set of database records;
tracking changes made to the first set of database records and maintaining a table of record changes;
performing a consolidation process to determine a cumulative record change for each of the first set of database records and determining which record changes in the table of record changes are duplicative and not implemented; and
propagating a user-selected set of database records between the first database to the second database in accordance with the table of record changes and the consolidation process, wherein the user-selected set of database records includes records associated with a product and an advertisement that are to be publically accessible on the second database.

2. A computer-readable media as defined in claim 1, wherein the user-selected set of database records comprises a subset of the data contained in the table of record changes.

3. A computer-readable media as defined in claim 1, further comprising instructions for tracking and updating the status of each record of the user-selected set of database records.

4. A computer-readable media as defined in claim 1, further comprising instructions for tracking and updating the status of each record in the first set of database records.

5. A computer-readable media as defined in claim 1, further comprising instructions for determining whether any exceptions have occurred during the propagation of the user-selected set of database records.

6. A computer-readable media as defined in claim 5, further comprising instructions for tracking and updating the status of each record of the user-selected set of database records, including whether an exception occurred during propagation of each record.

7. A computer-readable media as defined in claim 6, further comprising instructions for sending one or more alerts to one or more users relating to the status of each record of the user-selected set of database records, including whether an exception occurred during propagation of each record.

8. A computer-readable media as defined in claim 5, further comprising instructions for tracking and updating the status of each record of the first set of database records, including whether an exception occurred during propagation of each record.

9. A computer-readable media as defined in claim 8, further comprising instructions for sending one or more alerts to one or more users relating to status of each record of the first set of database records, including whether an exception occurred during propagation of each record.

10. A computer-readable media as defined in claim 1, wherein the propagation of a user-selected set of database records is executed in a single-threaded process.

11. A computer-readable media as defined in claim 1, wherein the propagation of a user-selected set of database records is executed in a multi-threaded process.

12. A computer-readable media as defined in claim 1, wherein at least one of the first and second databases is a database for a website.

13. A system for propagating database records from a first database to a second database via a computing device, comprising:
 a processor including a processing unit, and system memory which is operatively coupled via a bus;
 a first database associated with the processing unit containing a first set of database records, the first database being inaccessible to a public user;
 a second database associated with the processing unit containing a second set of database records, the second database being accessible to a public user;
 wherein the system tracks changes made to the first set of database records and maintains a table of record changes;
 wherein the system performs a consolidation process to determine a cumulative record change for each of the first set of database records and determines which record changes in the table of record changes are duplicative and not implemented; and
 wherein the system propagates a user-selected set of database records between the first database to the second database in accordance with the table of record changes and the consolidation process, wherein the user-selected set of database records includes records associated with a product and an advertisement that are to be accessible by the public user.

14. A system as defined in claim 13, wherein the user-selected set of database records comprises a subset of the data contained in the table of record changes.

15. A system as defined in claim 13, wherein the system further tracks and updates the status of each record of the user-selected set of database records.

16. A system as defined in claim 13, wherein the system further tracks and updates the status of each record in the first set of database records.

17. A system as defined in claim 13, wherein the system further determines whether any exceptions have occurred during the propagation of the user-selected set of database records.

18. A system as defined in claim 17, wherein the system further tracks and updates the status of each record of the user-selected set of database records, including whether an exception occurred during propagation of each record.

19. A system as defined in claim 18, wherein the system further sends one or more alerts to one or more users relating to the status of each record of the user-selected set of database records, including whether an exception occurred during propagation of each record.

20. A system as defined in claim 17, wherein the system further tracks and updates the status of each record of the first set of database records, including whether an exception occurred during propagation of each record.

21. A system as defined in claim 20, wherein the system further sends one or more alerts to one or more users relating to status of each record of the first set of database records, including whether an exception occurred during propagation of each record.

22. A system as defined in claim 13, wherein the propagation of a user-selected set of database records is executed in a single-threaded process.

23. A system as defined in claim 13, wherein the propagation of a user-selected set of database records is executed in a multi-threaded process.

24. A system as defined in claim 13, wherein at least one of the first and second databases is a database for a website.

25. A system as defined in claim 13, wherein at least one of the first and second databases is accessible via the Internet.

26. A system as defined in claim 13, wherein at least one of the first and second databases is a database for a retail website.

27. A system as defined in claim 13, wherein at least one of the first and second databases is a product database.

28. A system as defined in claim 13, wherein at least one of the first and second databases is a database containing information relating to products for sale on a retail website.

* * * * *